UNITED STATES PATENT OFFICE.

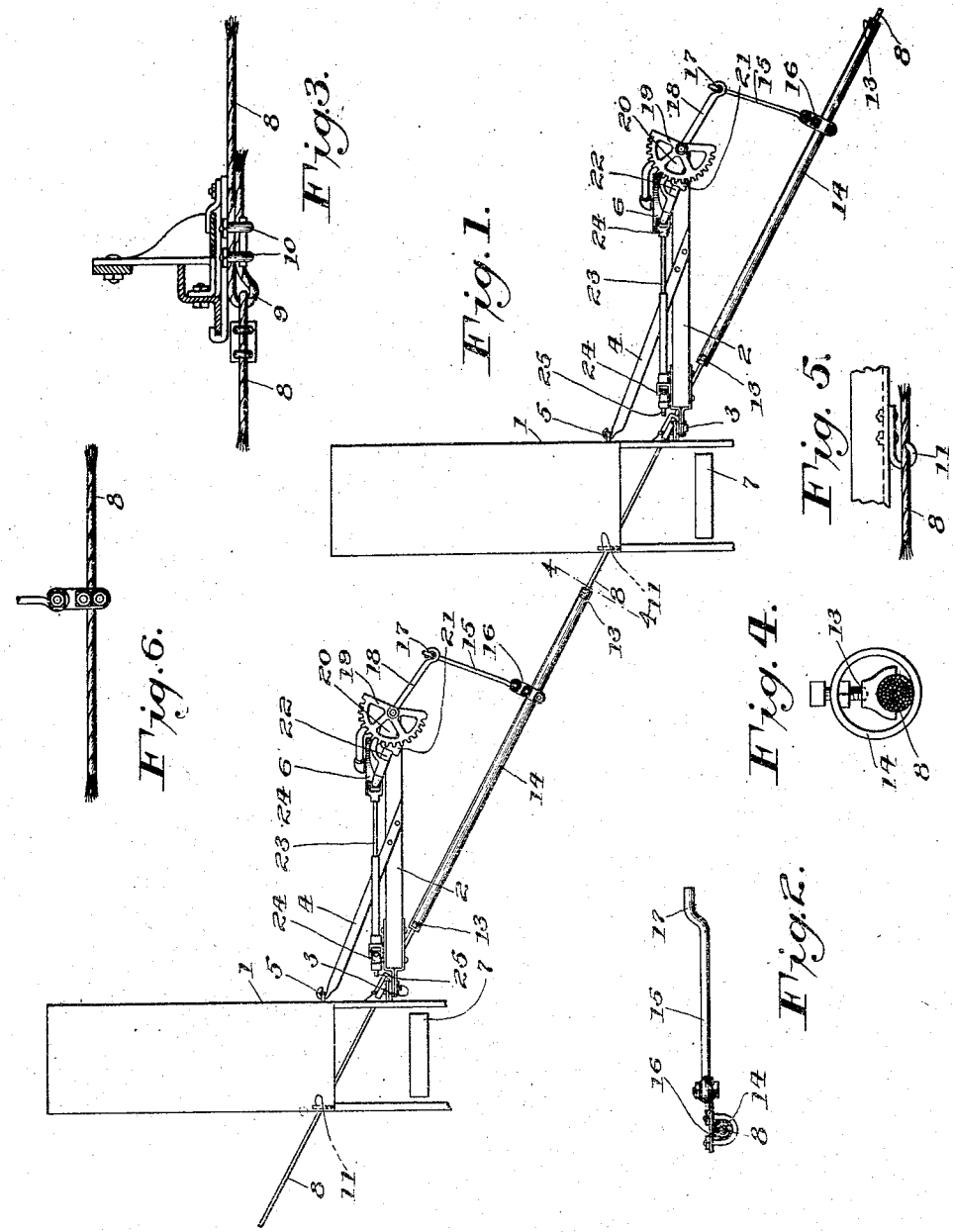

HERBERT B. SPERRY, OF CHICAGO, ILLINOIS, ASSIGNOR TO INTERNATIONAL HARVESTER COMPANY OF NEW JERSEY, A CORPORATION OF NEW JERSEY.

TANDEM DRAFT CONNECTION.

1,199,126.  Specification of Letters Patent.  Patented Sept. 26, 1916.

Application filed May 17, 1913. Serial No. 768,344.

*To all whom it may concern:*

Be it known that I, HERBERT B. SPERRY, a citizen of the United States, residing at Chicago, in the county of Cook and State of Illinois, have invented certain new and useful Improvements in Tandem Draft Connections, of which the following is a full, clear, and exact specification.

My invention relates to tandem draft connections.

It has for its object to improve and simplify the draft connections of a machine, such, for instance, as a harvester which is adapted to be trailed at the rear of another machine and maintained in predetermined relation threwith. I attain this object by providing improved means connecting the machine to the adjacent machine in such a manner that as it is trailed in the rear of the other, the movement of the front machine is directly imparted to the trailing machine and the two are always maintained in the desired relation.

In order that my invention may be clearly and fully disclosed, I have illustrated one embodiment of the same in the accompanying drawings, wherein the same is shown adapted to use in connection with a plurality of harvesters. It is to be understood, however, that the embodiment of my invention shown herein is susceptible of modification.

Figure 1 is a plan view of a plurality of harvesters arranged in gang relation, trailing one at the rear of the other; Fig. 2 is a detail view of a portion of the draft connection; Fig. 3 is a detail view of the connection of the draft cable to the harvester frame; Fig. 4 is a detail sectional view taken on line 4—4 of Fig. 1; Fig. 5 is a detail view of one of the cable connections; Fig. 6 is a top plan view of a modified form of connection to the draft cable.

The construction shown, when broadly considered, comprises a plurality of harvesters 1 arranged in the well known tandem relation and connected to each other, through improved means hereinafter described, in such a manner as to successively impart to each other the movement of the front harvester when turned in one direction.

The harvesters 1 may be of any desired construction. As shown herein, they are illustrated as left-hand harvesters and are each provided with a short forwardly extending stub or draft tongue 2 disposed substantially at right angles to the frame and in the plane of the line of draft. Each of these tongues 2 is pivotally connected at 3 to the harvester frame and is movable in a vertical plane thereon in such a manner as to permit movement of either the tongue or harvester relatively to the other. In a preferred form each of these stub tongues 2 is braced upon the harvester frame by a diagonally extending brace 4 movable with the tongue in a vertical plane about its pivot 5 upon the frame and are provided with suitably mounted caster wheels 6 on their front ends. It is to be noted that this pivotal connection is made at a point adjacent the main wheel 7 of a harvester and in front of the same.

Extending diagonally to the line of draft beneath the several harvesters is a flexible draft member or cable 8. If desired, this cable may be in a single length, or, where it is desired to vary the number of harvesters at intervals, it may be made up of a plurality of short lengths of cable attached together as shown at 9 in Fig. 3 by looping their adjacent ends in a well known manner. In whatever construction used, the cable is fixed to the under side of each harvester frame, as by bolts 10, at a point substantially beneath the pivot 3 of the stub tongue 2 and adjacent the main wheel 7 in such a manner that the tractive force is exerted upon the frame of each harvester at that point. In order to prevent lateral swinging of the cable beneath the frame, the same is also held in the desired position beneath the same by a hook 11 upon the under side of the frame and at the back thereof. (Fig. 5.)

In order to take up the slack of the cable and prevent the harvesters from riding forward on each other, I preferably provide on each cable a rigid stiffening member. This member is shown herein in the form of a pipe attached to the cable at its ends by a clamping connection 13. (Fig. 4) and through which the cable extends. It is to be noted that this pipe 14 is of such a length that it does not in any way interfere with the desired flexibility of the cable or at any time so engage with the harvester frame or other parts of the draft connections as to interfere therewith. As shown in Fig. 1, this pipe extends to a point adjacent the connection 13 of the cable 8 to the rear end of one harvester, and also extends to a point adjacent the stub tongue 2 on the next harvester in the rear thereof.

In order to place the harvesters under the control of their operators while running, I preferably provide connections intermediate the front end of the tongue 2 and a point between the ends of the pipe 14 which are operable by the operator. These connections comprise a link 15 preferably fixed to the pipe 14 by a suitable U-bolt and plate connection 16 and pivotally connected at its opposite end at 17 to an arm 18 movable with a sector 19 pivotally mounted upon a suitable bracket 20 on the end of the stub tongue 2. In a preferred form this bracket also acts as a bearing for the shank of the caster wheel 6. Operatively connected to this sector 19 through a gear 21 and shafts 22 and 23, suitably connected through universal joints 24, is a crank member 25 which extends upward to a point adjacent the operator's seat.

The operation of the construction shown is as follows: When the operator desires to change the angle or relation of the harvester upon which he is riding with respect to the next harvester, it is only necessary for him to rotate the crank member 25 in the proper direction to turn the sector 19 and thus throw the arm 18 about its pivot. The movement of this arm 18 is of course transmitted to the pivoted link 15, and since the latter is rigidly connected to the pipe 14, is also transmitted to the cable 8. The effect of this movement is to snub the cable closer to the draft tongue and since the tractive force is exerted upon the cable, swing the stub tongue and therefore the harvester, into the desired position. In this manner the transverse movement of the harvester may be adjusted as desired so that the width of cut may be regulated. Obviously the desired relation of the harvesters at a turn will be automatically maintained within certain limits without the necessity of this adjustment and what further readjustment is necessary after, or as the turn is made, may be readily obtained by proper manipulation of the crank 25.

In the construction shown in Fig. 1, the pipe 14 is used to prevent the harvesters riding forward upon each other. However, when operating under certain conditions, this pipe may be found to be unnecessary; as, for instance, during operation upon very level ground. Under such circumstances the link 15 may be directly connected to the cable 8, as shown in Fig. 6, the end of the link being fixed thereto in the same manner as that shown in Fig. 2, and the mechanism operating in all other respects in substantially the same manner. It is to be noted that in this construction the angular movement of each harvester is directly imparted to the trailing harvester without the necessity for the provision of additional reach bars and tongues. Further, since the cable is directly connected to the harvester frame at a point adjacent the main wheel, the tractive force is exerted directly upon each harvester at a point best calculated to give it its maximum effect and the strain of traction is removed from the steering mechanism. Attention is further directed to the fact that the construction shown is not only exceedingly simple but also of a type which may be readily and cheaply manufactured, and is adapted to use in connection with harvesters of standard construction.

While I have described one embodiment of my invention in this application, it is to be understood that the form shown herein may be modified without departing from the spirit of my invention.

What I claim as my invention and desire to secure by Letters Patent is:—

1. In a tandem draft connection, a machine frame, a tongue attached thereto, a flexible draft member attached to said frame and extending therefrom at an angle to said tongue, and means operatively connecting said flexible draft member intermediate its ends with said tongue for varying the angle of said tongue relative to said draft member, whereby said tongue is yieldingly held at a predetermined angle relative to the line of draft.

2. In a tandem draft connection, a machine frame, a flexible draft member attached thereto and normally disposed at an angle to the line of draft, a slack absorbing member on said flexible draft member, and means operable from said machine frame for varying the angle of said draft member and slack absorbing member relative to the line of draft.

3. In a tandem draft connection, a machine frame, a flexible draft member attached thereto and normally disposed at an angle to the line of draft, a slack absorbing member on said flexible draft member, and means operable from said machine frame and operatively connected to said slack absorbing member for varying the angle of said draft member and slack absorbing member relative to the line of draft.

4. In a tandem draft connection, a machine frame, a tongue pivoted thereto and movable in a vertical plane, a flexible draft connection attached to said frame at a point substantially beneath the pivot of said tongue and extending therefrom at an angle to said tongue, and a link operatively connecting said tongue with said flexible draft connection intermediate its ends and adjustable at will to vary the angle of said tongue relative to said flexible draft connection, whereby said tongue is yieldingly held at a predetermined angle relative to the line of draft.

5. In a tandem draft connection, a machine frame, a tongue pivoted thereto, a flexible draft member attached to said frame and extending therefrom at an angle to said tongue, and means for adjusting the angle between said elements comprising operative connections carried on said tongue and attached to said flexible member at a point intermediate its ends, whereby said tongue is yieldingly held at a predetermined angle relative to the line of draft.

6. In a tandem draft connection, a machine frame, a tongue attached thereto, a flexible draft member attached to said frame and extending therefrom at an angle to said tongue, a slack absorbing member carried on said flexible member, and means for adjusting the angle between said tongue and flexible member comprising link connections carried on said tongue and connected to said slack absorbing member at a point intermediate its ends.

7. In a tandem draft connection, a machine frame, a tongue pivotally connected thereto, a flexible draft connection attached to said frame at a point adjacent the pivot of said tongue and protruding from said frame at an angle with respect to said tongue, a slack absorbing member fixed to said flexible connection intermediate the ends thereof and extending along the same, and means for adjusting said flexible connection with respect to said tongue carried upon said tongue and attached to said slack absorbing member at a point intermediate its ends.

In testimony whereof I affix my signature, in the presence of two witnesses.

HERBERT B. SPERRY.

Witnesses:
P. H. SHEA,
F. A. RYTHER.